United States Patent [19]

Yuasa et al.

[11] Patent Number: 4,496,987
[45] Date of Patent: Jan. 29, 1985

[54] CONVERSION OF AN ANALOG IMAGE SIGNAL INTO A BINARY IMAGE SIGNAL

[75] Inventors: Kazuhiro Yuasa, Zama; Shuichi Takahashi; Mitsuru Kondo, both of Sagamihara, all of Japan

[73] Assignee: Ricoh Company, Ltd., Japan

[21] Appl. No.: 308,088

[22] Filed: Oct. 2, 1981

[51] Int. Cl.³ .............................................. H03K 13/00
[52] U.S. Cl. .............................. 358/283; 340/347 AD
[58] Field of Search ............ 340/347 AD, 146.3 AG; 358/283, 298, 299

[56] References Cited

U.S. PATENT DOCUMENTS

| | | | |
|---|---|---|---|
| 4,149,194 | 4/1979 | Holladay | 358/283 |
| 4,185,304 | 1/1980 | Holladay | 358/283 |
| 4,214,277 | 7/1980 | Urich | 358/283 |

FOREIGN PATENT DOCUMENTS

| | | | |
|---|---|---|---|
| 25672 | 3/1981 | European Pat. Off. | 358/283 |
| 147728 | 11/1979 | Japan | 358/283 |
| 150667 | 11/1980 | Japan | 358/283 |

Primary Examiner—C. D. Miller
Attorney, Agent, or Firm—Guy W. Shoup

[57] ABSTRACT

An image signal processing system for converting an analog image signal into a digital or binary image signal, capable of representing half-tone or gray scale when the corresponding visual image is reproduced by a dot-matrix type printer, is provided. The present system includes storing means for storing at least an array of thresholds, at least one of the thresholds being different in level from the other to form an array pattern. Such a threshold array is used as a reference level in producing a binary image signal. Half-tone is represented by the degree of black dot density per unit area.

3 Claims, 16 Drawing Figures

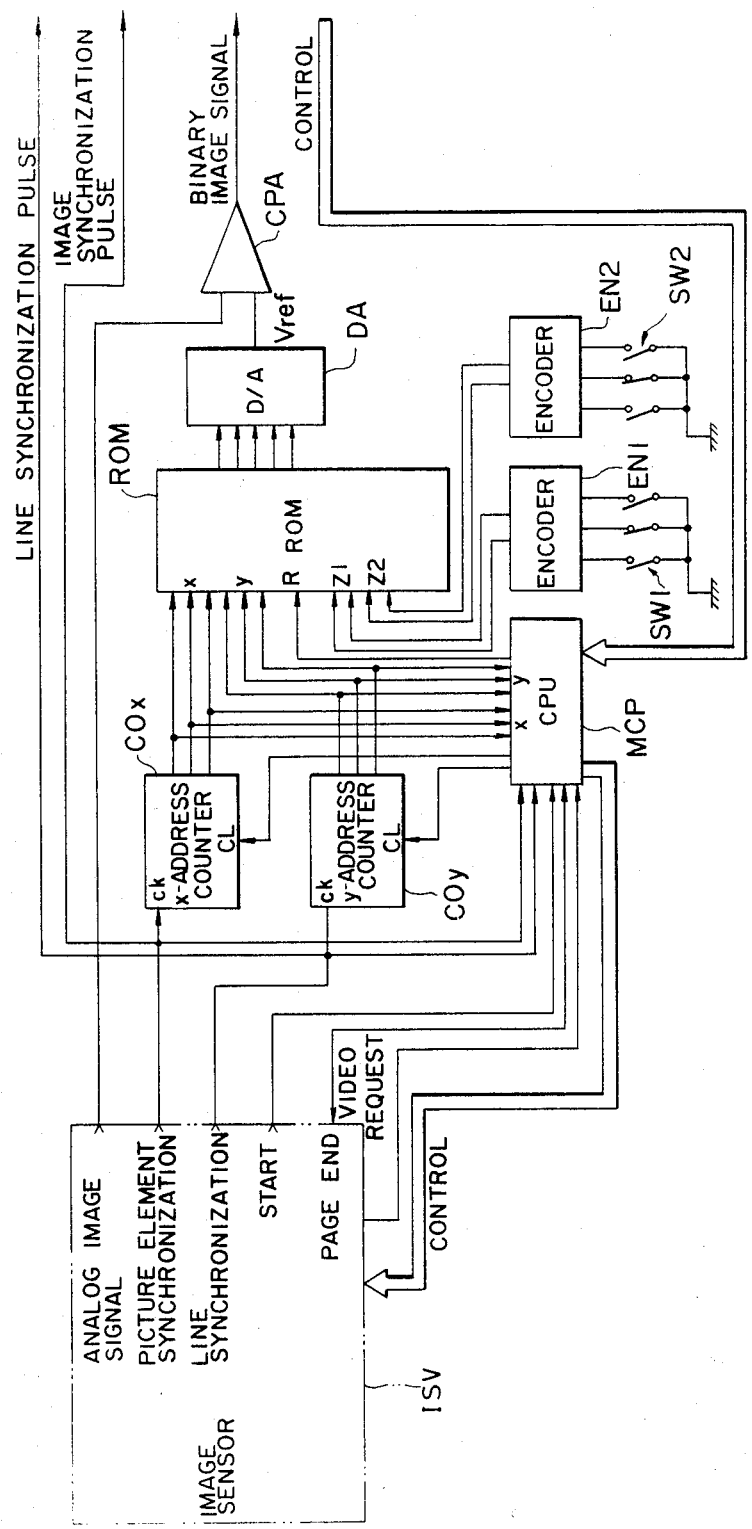
F I G. 1

CONVERSION OF AN ANALOG IMAGE SIGNAL INTO A BINARY IMAGE SIGNAL

BACKGROUND OF THE INVENTION

1. Field of the invention

This invention relates to an image signal processing system for use with a facsimile and the like and, more in particular, to a system for converting an analog image signal obtained by reading an original by means of an image sensor into a binary image signal for further processing such as application to a dot-matrix type recording apparatus or transmission to a remote place.

2. Description of the Prior Art

An image signal processing system for converting an analog image signal into a digital or binary image signal has been well known. For example, in transmitting image data from one place to a remote place, it is preferable to convert an analog image signal obtained by reading an original into a digital signal in the form of the binary numbers "0" and "1" before transmitting to a remote place from various reasons. Such a digital signal may further be converted into compressed codes before transmission as in a digital facsimile communication system. Moreover, a digital image signal represented by the binary numbers is sometimes required at the output end because of the use of a dot-matrix type recording apparatus such as an ink-jet printer and a multi-stylus electrostatic printer.

Although there are numerous advantages in the use of a binary image signal over an analog image signal itself, one of the difficulties encountered in handling the binary image signal is how to deal with an original having tone variations such as a photographic picture. Since the binary image signal only consists of two possible states, high and low, tone usually cannot be shown on a reproduced image and, therefore, a gray area is represented either as "white" or "black". Several techniques have been proposed to represent tone differences with the use of a binary image signal, such as the dither technique; however, none of the prior art techniques is satisfactory.

SUMMARY OF THE INVENTION

In accordance with the present invention, there is provided an improved image processing system for converting an analog image signal into a binary image signal which allows to represent tone differences on a reproduced image. The advantages of the present invention are preferably attained by providing storing means for storing an array of thresholds, at least one of said thresholds being different in level from the other to form an array pattern; comparator means having a first input connected to receive threshold information from said storing means as a reference threshold; analog image signal supplying means for supplying an analog image signal, which is obtained by reading an original photoelectrically, to a second input of said comparator means; and addressing means connected between said analog image signal supplying means and said storing means for addressing said array of thresholds to supply the threshold information to the first input of said comparator means in response to a synchronization signal from said analog image signal supplying means.

Preferably, a first set of arrays of thresholds, each having the same array pattern with different thresholds in level, is stored in the storing means, and selecting means is provided as connected to said storing means for selecting one of the arrays. It is further preferable that a second set of arrays of thresholds, each having the same array pattern different from that of the first set with different thresholds in level, is also stored in the storing means. These arrays of thresholds are preferably of a two dimensional array of m by n matrix, and the addressing means includes a column addressing means which receives a picture element synchronization signal from said analog image signal supplying means for addressing the column or the two-dimensional array, and a row addressing means which receives a line synchronization signal from said analog image signal supplying means for addressing the row of the two-dimensional array. The row and column addressing means may be comprised of address counters.

The storing means is preferably comprised of a read only memory (ROM) which stores the thresholds in binary codes and a digital-to-analog (D/A) converter is connected between the output of the storing means and the first input of the comparator means. Moreover, the analog image signal supplying means is preferably an image sensor which photoelectrically reads an original to produce the analog image signal.

Therefore, it is an object of the present invention to provide an improved system for converting an analog image signal into a binary image signal.

Another object of the present invention is to provide an image signal processing system for producing a binary image signal which can represent tone differences when a visual image is formed from the binary image signal.

A further object of the present invention is to provide an image signal processing system which may be combined with a dot-matrix type recording apparatus in forming a visual image.

A still further object of the present invention is to provide an image signal processing system which is simple in structure and, therefore, easy to manufacture.

A still further object of the present invention is to provide an image signal processing system which is capable of producing an appropriate binary image signal at all times irrespective of the state of an original.

Other objects, advantages and novel features of the present invention will become apparent from the following detailed description of the invention when considered in conjunction with the accompanying drawings.

BRIEF DESCRIPTION OF THE DRAWINGS

FIG. 1 is a block diagram of an image signal processing system embodying the present invention;

FIGS. 2 (A) through (C) are schematic illustrations showing a first set of three 2-dimensional arrays of thresholds, each array having the same grid-like pattern with different threshold levels;

FIGS. 3 (A) through (C) are schematic illustrations showing a second set of three 2-dimensional arrays of thresholds, each array having the same oblique line pattern with different threshold levels;

FIGS. 4 (A) through (C) are schematic illustrations showing a third set of three 2-demensional arrays of thresholds, each array having the same random pattern with different threshold levels;

FIGS. 6 (A) through (C) are schematic illustrations showing an exemplifying set of three 1-dimensional arrays of thresholds, each array having the same arrangement pattern with different threshold levels.

DESCRIPTION OF THE PREFERRED ENBODIMENTS

Figure 5A:
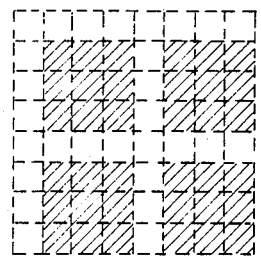
FIGS. 5 (A) and (B) are schematic illustrations which show how the half-tone can be represented in accordance with the present invention.

Referring now to FIG. 1, there is shown an analog image signal processing system which includes an image sensor ISV for producing an analog image signal to be processed into a binary image signal by reading an original (not shown). The image sensor ISV may include a charge coupled device (CCD) or a photodiode array. One output of the image sensor ISV is connected to one input of a comparator CPA, the output of which supplies a binary image signal, whereby the analog image signal obtained by photoelectrically reading the original is supplied to the one input of the comparator CPA. A second output of the image sensor ISV is connected to a x-address counter COx having its output connected to a read only memory ROM which stores several sets of arrays of thresholds as will be described in detail later. Thus, a picture element synchronization signal is fed to the counter COx from the image sensor ISV.

A third output of the image sensor ISV is connected to a y-address counter COy, the output of which is connected to the read only memory ROM. Therefore, a line synchronization signal is fed to the counter COy from the image sensor ISV. The image sensor ISV is also connected with a central processing unit MCP to supply start and page end signals thereto and to receive a video request signal therefrom. The unit MCP may be comprised of a one chip microprocessor or an external microcomputer. The unit MCP is also connected to the counters COx and COy and the memory ROM as shown in FIG. 1. The output of the memory ROM is connected to an input of a digital-to-analog converter DA, the output of which is connected to the remaining input of the comparator CPA.

As mentioned above, the memory ROM stores threshold information in the form of a 2-dimensional array as shown in FIGS. 2 through 4. FIGS. 2 (A) through (C) show a first array set which includes three 8-by-8 threshold arrays, each having the same grid-like array pattern with different threshold levels, the average threshold level increasing from (A) to (C). FIGS. 3 (A) through (C) show a second array set which includes three 8-by-8 threshold arrays, each having the same oblique line array pattern with different threshold levels, the average threshold level increasing from (A) to (C). FIGS. 4 (A) through (C) show a third array set which includes three 8-by-8 threshold arrays, each having the same random array pattern with different threshold levels, the average threshold level increasing from (A) to (C).

As shown, each array is identified by a pair of codes, Z1 and Z2, each comprised of two binary bits. The first code Z1=01 indicates the first array set, Z1=10 the second array set and Z1=11 the third array set. The second code Z2 indicates the average threshold level or density of "black" dots with Z2=01 for a low average threshold level or a high "black" dot density, Z2=10 for an intermediate average threshold level or an intermediate "black" dot density, and Z2=11 for a high average threshold level or a low "black" dot density.

As shown in FIG. 1, pattern select switches SW1 are provided as connected to an encoder EN1 which is also connected to the memory ROM. Besides, density select switches SW2 are provided as connected to an encoder EN2 which is also connected to the memory ROM. Therefore, a desired array of thresholds may be specified by selecting one of the switches SW1 and then one of the switches SW2. It is to be noted that four or more array sets may be stored in the memory ROM and each set may include four or more arrays different in the average threshold level.

Each of the arrays stored in the memory ROM has 64 bits of threshold information arranged in an 8-by-8 matrix. For example, the threshold array shown in FIG. 2 (A) contains four kinds of thresholds different in level, i.e., "1" through "4", and these thresholds different in level are arranged regularly in a grid-like format or pattern. The threshold arrays of FIGS. 2 (B) and (C) have the same pattern as that of FIG. 2 (A), but each bit has a higher threshold by the amount of "2" and "4", respectively.

Each of the bits, or thresholds, in a specified array is addressed by a column address code in the x-direction supplied from the x-address counter COx and a row address code in the y-direction supplied from the y-address counter COy. In a preferred form of the present invention, the image sensor ISV reads one line or a horizontal scanning sector of an original in a first direction, or across the width of the original, to supply an analog image signal corresponding to the image segment of the original thus read as a serial output together with associated picture element synchronization pulses. Then, the original is advanced in a second direction, or the direction perpendicular to the width of the original, with respect to the image sensor ISV or vice versa over a predetermined distance, preferably a distance between the two adjacent picture elements, and, thereafter, the image sensor ISV reads the next line of the original in the first direction. The above process is carried out repetitively to complete reading or scanning of the original from its beginning to the page end.

The image sensor ISV includes a line of sensing elements with the arrangement of 8 elements or dots/mm in the first direction, or across the width of an original. Each advancement of the original in the second direction is preferably set to the distance between the two adjacent sensing elements of the image sensor ISV. Thus, the sensor ISV supplies picture element synchronization pulses and line synchronization pulses with the frequency corresponding to 8 pulses/mm in the first or x-direction and in the second or y-direction, respectively. As shown in FIG. 1, the picture element synchronization and line synchronization pulses are supplied to the respective pulse inputs ck of the x-address and y-address counters, COx and COy, respectively. Each of the threshold arrays shown in FIGS. 2 through 4 contains 8 columns in the x-direction and 8 rows in the y-direction and, therefore, the square area of the array corresponds to an original segment of 1 $mm^2$ with each threshold of the array corresponding to a picture element read by the image sensor ISV. Such a structure is particularly advantageous since it occupies only a small storing space in the memory ROM.

The microprocessor MCP sends a clear signal to the input CL of the counter COx when its counted value reaches "8", thereby clearing the counter COx. Accordingly, the count value of the counter COx varies as "0", "1", "2", ..., "6", "7", "0" ("8"; clear), "1", "2", ..., "6", "7", "0" ("8"; clear), ... in synchronization with the picture element synchronization pulses, and the output of the counter COx is supplied to the x-address input of the memory ROM. On the other hand, the microprocessor MCP clears the counter COy when its count value reaches "8." Thus, the count value of the counter COy also varies as "0", "1", "2", ..., "6", "7", "0" ("8"; clear), "1", "2", ..., "6", "7", "0" ("8"; clear), ... in synchronization with the line synchronization pulses, and the output of the counter COy is supplied to the y-address input of the memory ROM. In this manner, a particular threshold data to be compared with a corresponding analog image signal may be determined when the following four parameters are specified. These parameters are the output code Z1 of the encoder EN1, the output code Z2 of the encoder EN2, the count value x of the counter COx and the count value y of the counter COy.

In operation, when the microprocessor MCP receives a signal for producing a binary image signal, it supplies a VIDEO REQUEST signal to the image sensor ISV, initializes the counters COx and COy and sets up the memory ROM in a read-out state. Suppose that switches SW1 and SW2 have been selected such that Z1=01 and Z2=10, indicating that the threshold array of FIG. 2 (B) is to be used for supplying threshold information to the comparator CPA. Then, the coded threshold "6" at x=0 and y=0 in the threshold array of FIG. 2 (B) is first read out of the memory ROM and supplied to the D/A converter for producing the analog signal corresponding to the coded threshold "6." The thus obtained analog signal is supplied to one input of the comparator as a reference threshold voltage $V_{ref}$. At the same time, the image sensor ISV supplies the first analog image signal, corresponding to the first picture element in the first horizontal scanning sector, to the remaining input of the comparator CPA for comparison with the threshold signal. As a result, the comparator CPA supplies a binary image signal corresponding to the first analog image signal as its output.

When the image sensor ISV supplies a picture element synchronization pulse, the counter COx counts up to "1" so that the memory ROM supplies the threshold "6" at x=1 and y=0 in the array shown in FIG. 2 (B). In this manner, the counter COx is incremented by +1 every time when it receives the picture element synchronization pluse from the sensor ISV and, therefore, the address of the memory ROM to be read out shifts to the right or x=2, 3, ... at y=0. But, as soon as the counter COx reaches value "8", the microprocessor MCP sends a signal to clear the counter COx, thereby x-address of the array returning to "0." As understood, the eight bits of threshold information in the first row, or y=0, are read out continuously in repetition.

Figure 7:
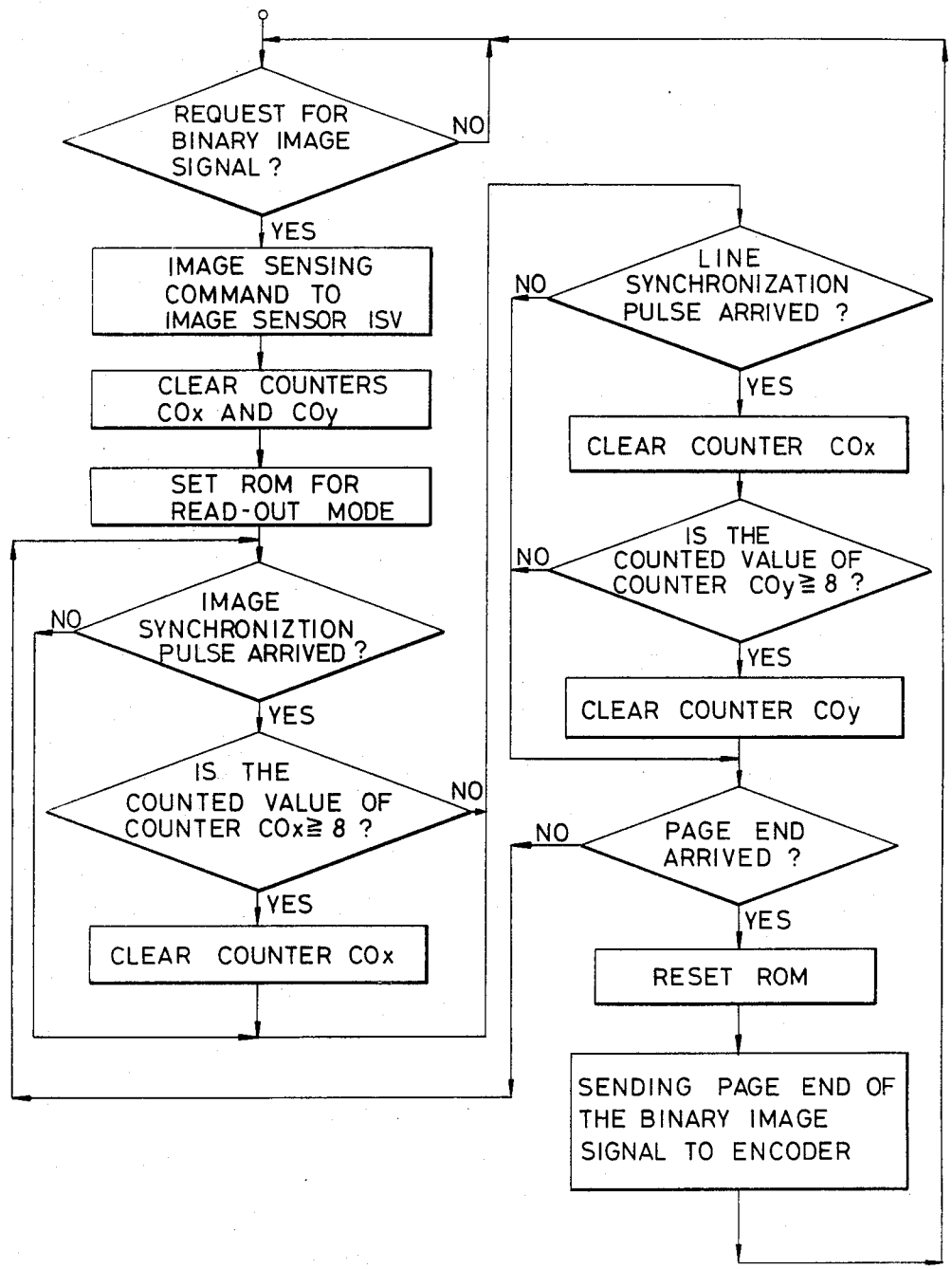
FIG. 7 is a flow chart showing the steps for converting an analog image signal into a binary image signal in accordance with the present invention.

However, when the counter COy receives the line synchronization signal, it is incremented by +1 and at the same time the counter COx is cleared by the microprocessor MCP. This prepares the memory ROM to supply threshold information in the second row, or y=1 of the array shown in FIG. 2 (B). Thus, as the counter COx receives the picture element synchronization pulse, the x-address changes as x=0, 1, 2, 3, ..., and correspondingly the threshold information is supplied as "6" (x=0), "5" (x=1), "4" (x=2), "5" (x=3), etc. Similarly with the first row, the eight threshold bits in the second row are repetitively used until the next line synchronization pulse is received by the counter COy. Then, when the microprocessor MCP receives the page end signal as supplied from the sensor ISV, the microprocessor MCP sends a signal to the memory ROM for resetting the read-out state. FIG. 7 is a flow chart showing the sequence of operation of the system shown in FIG. 1.

Figure 5B:
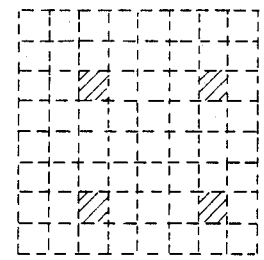

Now, description will be had with respect to how a gray area may be represented in accordance with the present invention with particular reference to FIGS. 5 (A) and (B). The square area defined by the peripheral dotted line in FIGS. 5 corresponds to a segment of an original which is gray or half-tone, and the segment is subdivided into 64 portions by dotted lines, whereby each portion corresponds to a picture element.

Suppose that the threshold array of FIG. 2 (A) has been selected with Z1=01 and Z2=01. Further, suppose that the segment of FIG. 5 (A) is a darker gray area, having the level "3.5" throughout the area; whereas, the other segment of FIG. 5 (B) is a lighter gray area, having the level "1.5" throughout the area. Under the circumstances, when the binary image signal processed by the system of FIG. 1 is applied to a dot-matrix type recording apparatus, resulting black dot distributions will be as shown in FIGS. 5 (A) and (B). More black dots will appear in FIG. 5 (A), as indicated by the shaded lines, since it is a darker gray area. On the other hand, there is less black dots in FIG. 5 (B) since it is a lighter gray area.

FIGS. 6(A) through (C) show another embodiment of the present invention, in which the threshold array takes 1-dimensional arrangement. All of the arrays shown in FIGS. 6 have the same arrangement pattern with different threshold levels. Similarly with the 2-dimensional case, 1-dimensional threshold arrays of different patterns may be stored in the memory ROM and each set of 1-dimensional threshold arrays having the same pattern may include as many arrays in different threshold levels as desired. In accordance with this embodiment, the space for storing threshold arrays may be minimized and the y-address counter COy could be eliminated.

As described above, in accordance with the present inventions, half-tone or gray scale may be represented on a reproduced image depending upon the density distribution of black or white dots, though an analog image signal is converted into a binary image signal. Moreover, with the provision of a plurality of threshold arrays different in pattern and/or different in level, it can gurantee that a reproduced image of high quality can be obtained at all times irrespective of the condition of an original by selecting an appropriate threshold array, the present invention allows to obtain a binary image signal capable of representing tone differences on a reproduced copy for virtually any size of an original with requiring a relatively small space for storing necessary threshold information and with a simple over-all structure as well.

While the above provides a full and complete disclosure of the preferred embodiments of the present invention, various modifications, alternate constructions and equivalents may be employed without departing from the true spirit and scope of the invention. For example, use may be made of a programmable read only memory (PROM), erasable PROM, or random access memory in place of the read only memory. Therefore, the above description and illustration should not be costrued as limiting the scope of the invention, which is defined by the appended claims.

What is claimed is:

1. A system for converting an analog image signal into a binary image signal which is capable of representing tone differences when the corresponding visual image is reproduced, comprising:

storing means for storing a first plurality of threshold array sets, each set being different in array pattern and including a second plurality of threshold arrays which is the same in array pattern but different in threshold level, each threshold of each of said threshold arrays corresponding to a picture element;

comparator means having a pair of first and second inputs, said first input being connected to receive threshold information from said storing means as a reference threshold;

analog image signal supplying means for supplying an analog image signal to said second input of said comparator means;

selecting means connected to said storing means for selecting one of said threshold arrays stored in said storing means to be in an operative condition; and addressing means connected between said analog image signal supplying means and said storing means for addressing said one of said threshold arrays selected by said selecting means to supply the threshold information to the first input of said comparator means in response to a synchronization signal from said analog image signal supplying means.

2. The system of claim 1 wherein said selecting means includes a first set of switches for selecting one of said first plurality of threshold array sets and a second set of switches for selecting one of said second plurality of threshold arrays in said threshold array set selected by said first set of switches.

3. The system of claim 1 wherein each of the threshold arrays stored in said storing means is a 2-dimensional array of m-by-n matrix, and said addressing means includes column addressing means which receives a picture element synchronization signal from said analog image signal supplying means for addressing the column of the 2-dimensional array and row addressing means which receives a line synchronization signal from said analog image signal supplying means for addressing the row of the 2-dimensional array.

* * * * *

UNITED STATES PATENT AND TRADEMARK OFFICE
CERTIFICATE OF CORRECTION

PATENT NO. : 4,496,987
DATED : January 29, 1985
INVENTOR(S) : Kazuhiro Yuasa, et al It is certified that error appears in the above-identified patent and that said Letters Patent is hereby corrected as shown below:

On the title page Insert

-- Foreign Application Priority Data
October 3, 1980     Japan     55-138282 --.

Signed and Sealed this

Second Day of August, 1988

Attest:

DONALD J. QUIGG

Attesting Officer

Commissioner of Patents and Trademarks